(12) United States Patent
Pally et al.

(10) Patent No.: US 7,658,283 B2
(45) Date of Patent: Feb. 9, 2010

(54) MAGAZINE STRIP FOR FASTENING ELEMENTS

(75) Inventors: Andreas Pally, Baar (CH); Gerd Daubinger, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 519 days.

(21) Appl. No.: 11/285,553

(22) Filed: Nov. 21, 2005

(65) Prior Publication Data

US 2006/0186002 A1 Aug. 24, 2006

Related U.S. Application Data

(63) Continuation-in-part of application No. 10/346,790, filed on Jan. 16, 2003, now abandoned.

(30) Foreign Application Priority Data

Mar. 25, 2002 (DE) .............................. 102 13 219

(51) Int. Cl.
B65D 85/24 (2006.01)
(52) U.S. Cl. ...................................... 206/338; 206/345
(58) Field of Classification Search ................. 206/338, 206/1.5, 718, 820, 340, 345, 701, 706; 221/307, 221/310, 26, 197; 227/120, 123
See application file for complete search history.

(56) References Cited

U.S. PATENT DOCUMENTS

| 354,235 | A | | 12/1886 | Richards |
| 1,054,707 | A | | 3/1913 | Mertens |
| 2,246,457 | A | * | 6/1941 | Schultz ........................ 403/217 |
| 2,437,956 | A | * | 3/1948 | Hessel ......................... 221/307 |
| 2,481,495 | A | | 9/1949 | Borthwick |
| 3,411,665 | A | | 11/1968 | Milton |
| 4,172,523 | A | | 10/1979 | Weglage |
| 4,228,918 | A | | 10/1980 | Kellogg |
| 4,282,630 | A | * | 8/1981 | Toder ......................... 206/343 |
| 4,633,605 | A | | 1/1987 | Kang |
| 4,706,812 | A | | 11/1987 | Spinelli et al. |
| 4,821,877 | A | | 4/1989 | Aab et al. |
| 5,397,092 | A | * | 3/1995 | Black ........................ 248/490 |
| 5,918,789 | A | * | 7/1999 | Olvera et al. ................. 227/119 |
| 5,950,864 | A | * | 9/1999 | Cash et al. .................. 221/227 |
| 6,640,968 | B2 | * | 11/2003 | Selle .......................... 206/303 |

* cited by examiner

Primary Examiner—J. Gregory Pickett
(74) Attorney, Agent, or Firm—Abelman, Frayne & Schwab

(57) ABSTRACT

A magazine strip for carrying fastening elements (1) including two opposite side walls (2) projecting from rear wall (3), extending parallel to each other in a longitudinal direction (L) of the magazine strip, and forming together a space (4) for receiving the fastening elements (1) at least along a portion of a longitudinal extent (a) of the fastening elements, and a loss-preventing element (7) for preventing the fastening elements from falling out in a direction transverse to the longitudinal direction of the magazine strip and having a spring element acting in a direction transverse to a longitudinal extent of the side walls (2) and narrowing at least partially an inner width of the receiving space (4).

13 Claims, 5 Drawing Sheets

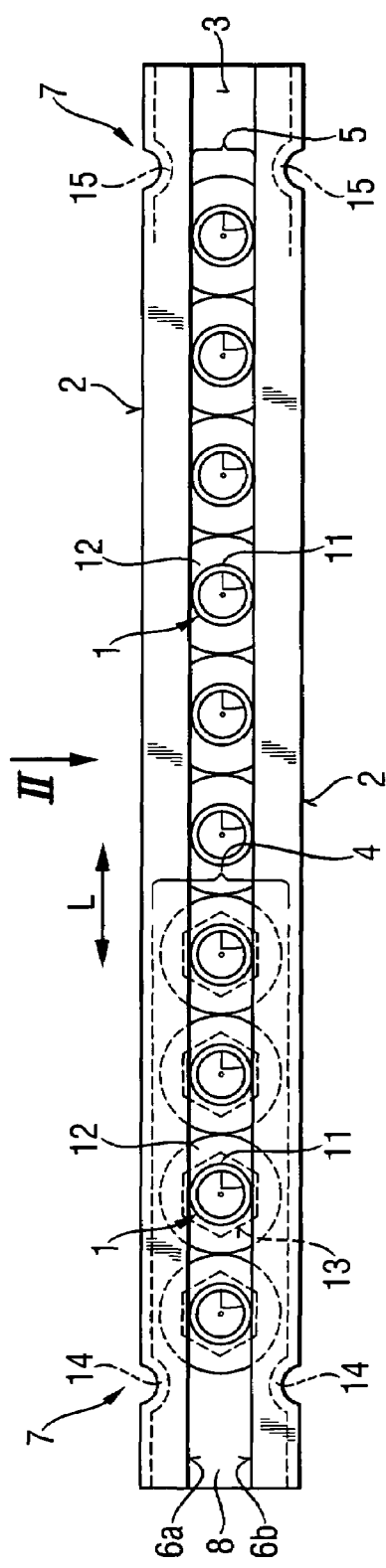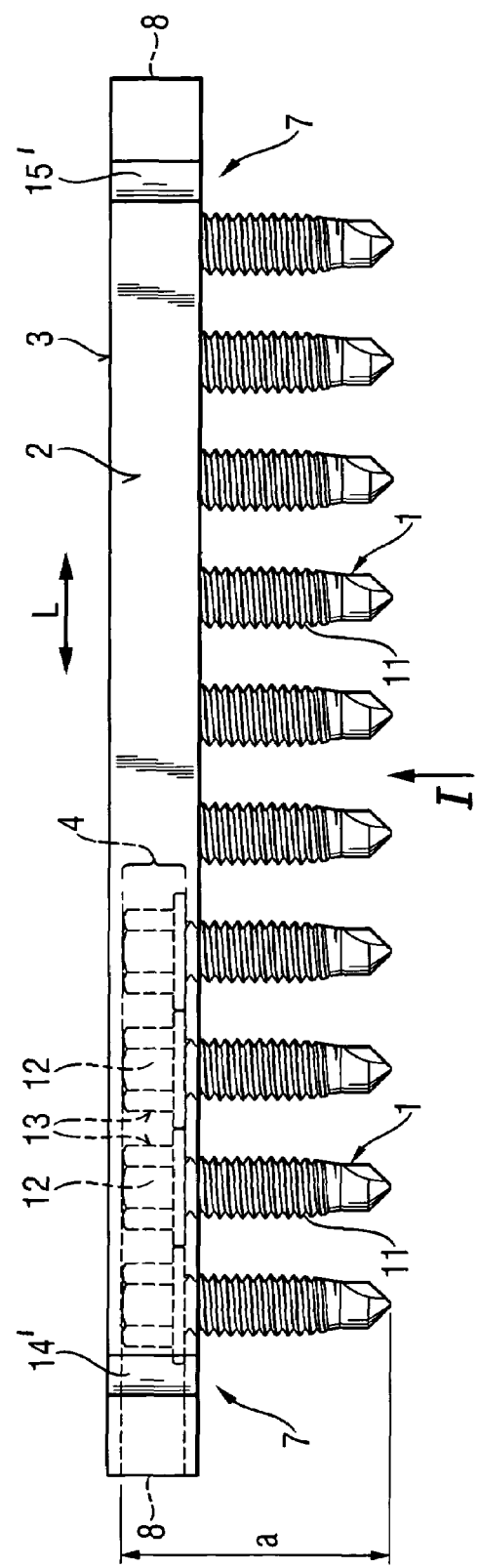

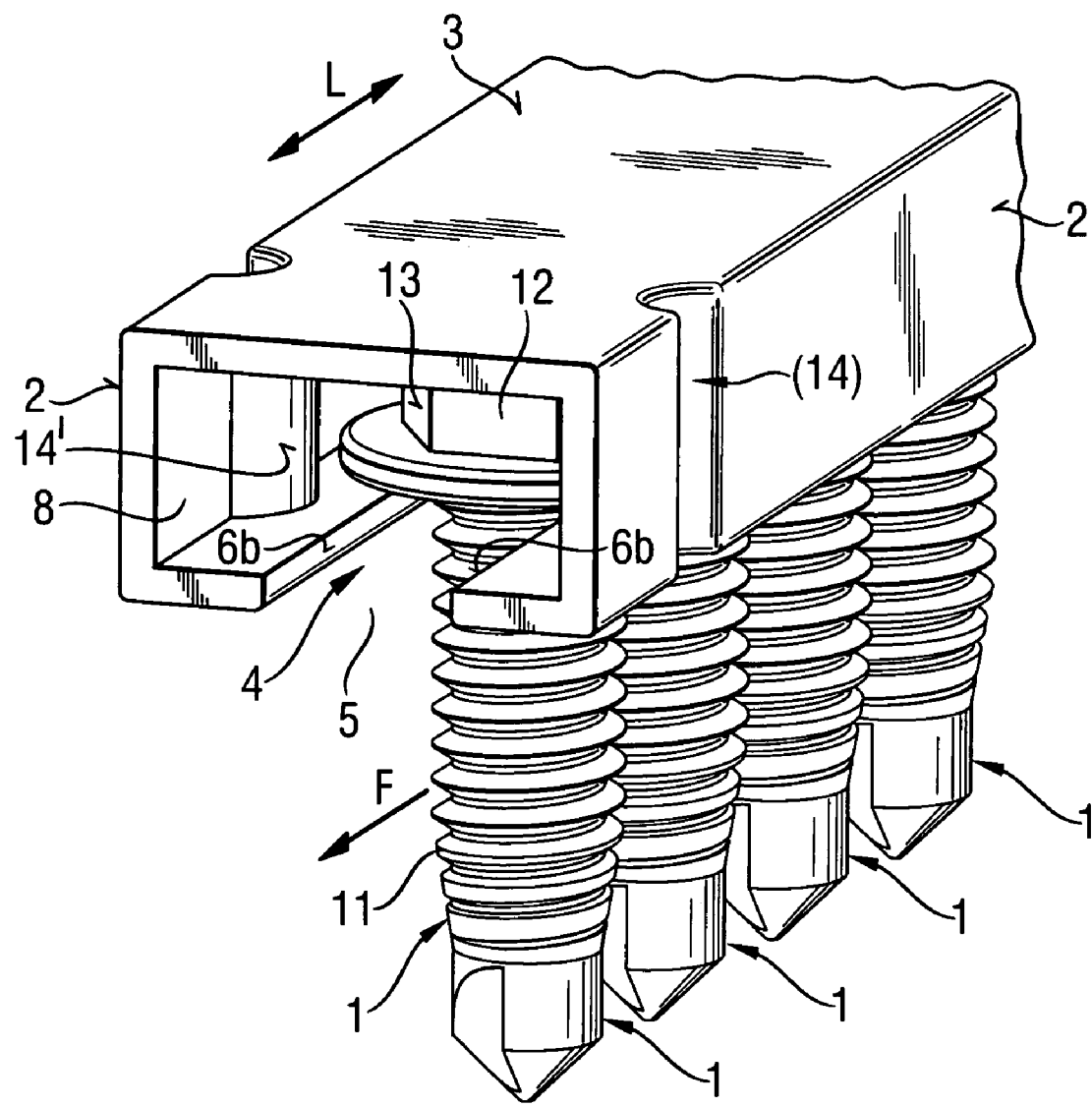

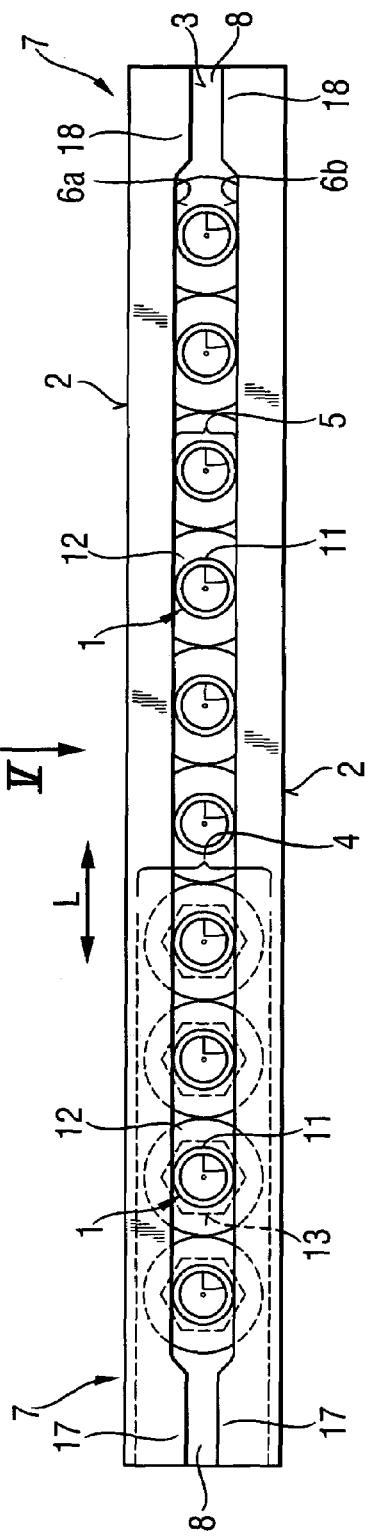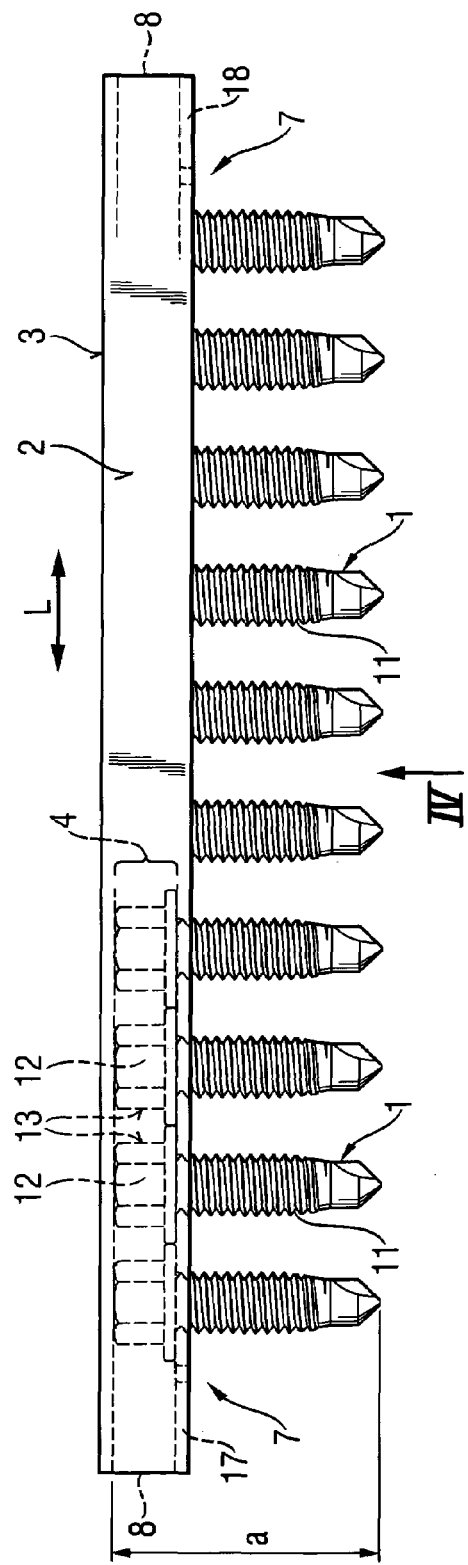

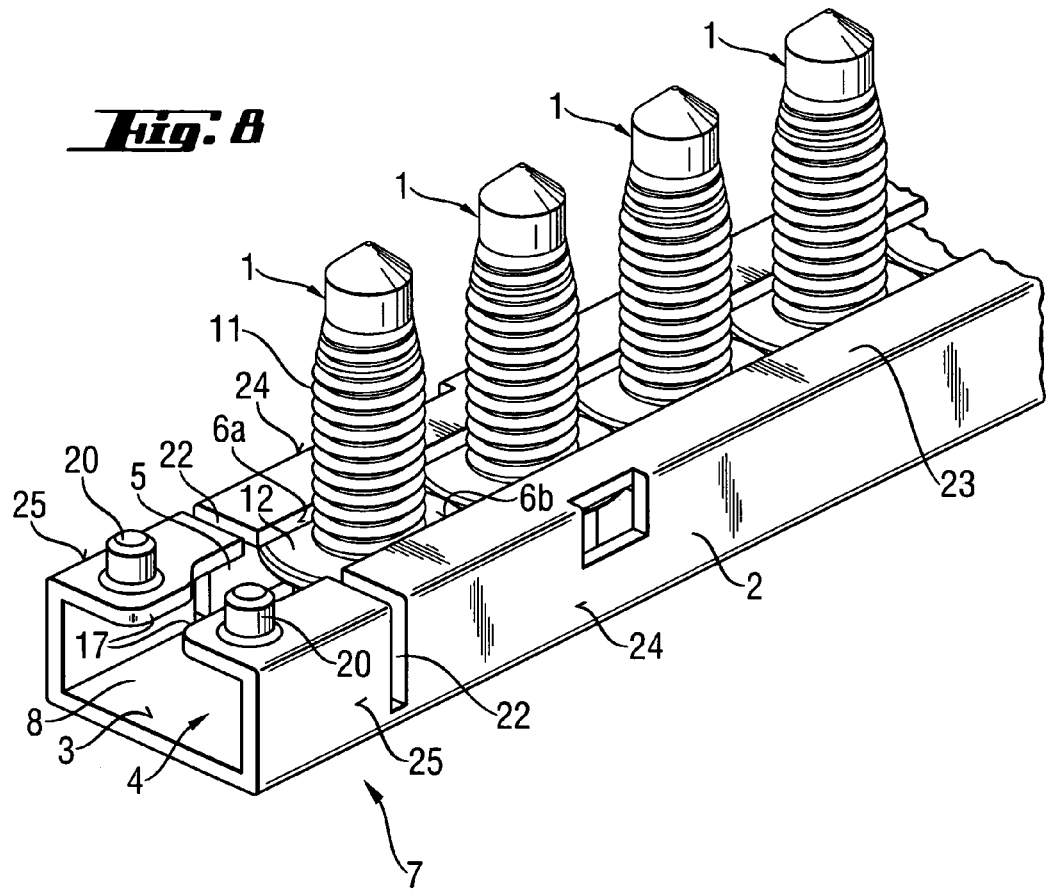
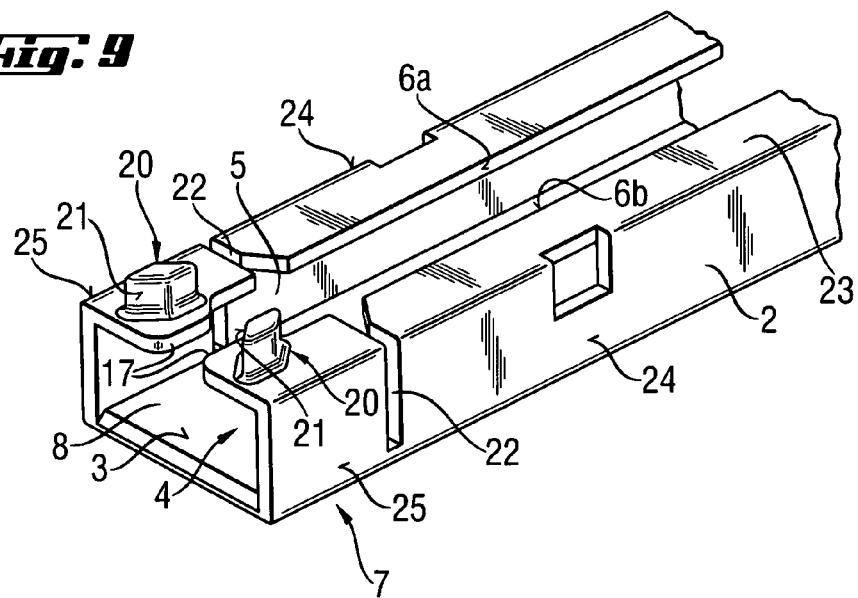

MAGAZINE STRIP FOR FASTENING ELEMENTS

RELATED APPLICATIONS

This application is a continuation-in-part of application Ser. No. 10/346,790 filed Jan. 16, 2003, now abandoned.

BACKGROUND OF THE INVENTION

1. Field of the Invention

The present invention relates to a magazine strip for carrying fastening elements and having a rear wall, two opposite side walls projecting from the rear wall, extending parallel to each other in a longitudinal direction of the magazine strip, and forming together a space for receiving the fastening elements at least along a portion of a longitudinal extent of the fastening elements, with end regions of the side walls defining an opening extending in the longitudinal direction of the magazine strip and limiting the receiving space, and loss-preventing means for preventing the fastening elements from falling out of the magazine strip.

2. Description of the Prior Art

As mentioned above, the magazine strips of the type described above serve for carrying fastening elements, in particular, screws. The magazine strip has, as it has also been described above, two opposite side wall extending substantially parallel to each other in the longitudinal direction of the magazine strip and projecting from a rear wall for forming a fastening element receiving space. The fastening elements are at least partially received in the receiving space and are guided by the side walls of the magazine strip. The side walls have end regions which define an extending in the longitudinal direction of the magazine strip, opening that limits the receiving space. The magazine strip further includes loss-preventing means that prevents falling out of the fastening elements from the receiving space in a direction transverse to the longitudinal direction of the magazine strip. During the use of the magazine strip in a setting tool, the loss-preventing means is released, which permits displacement of a fastening element out of the receiving space in the longitudinal direction of the magazine strip.

U.S. Pat. No. 3,891,014 discloses a magazine strip with two opposite, extending substantially parallel to each other, side walls which form a receiving space. The side walls project from a rear wall and have free end regions forming an opening extending in the longitudinal direction of the magazine strip and limiting the receiving space. At opposite longitudinal ends of the magazine strip, there is provided loss-preventing means which is formed as a locking tongue extending into the receiving space. The locking tongues are resilient and extend into the receiving space under a preload. Upon displacement of the magazine strip, the locking tongue is displaced at least partially out of the receiving space by a release mechanism against a biasing force, which permits displacement of the fastening elements out of the receiving space.

A drawback of the strip magazine of U.S. Pat. No. 3,891,014 consists in that for actuation of the loss-preventing means, a separate and mechanically complicated, release mechanism is needed. Also, forming the loss-preventing means of several elements negatively affects the economic efficiency of the strip magazine.

Accordingly, an object of the present invention is to provide a magazine strip with loss-preventing means and that can be economically produced.

SUMMARY OF THE INVENTION

This and other objects of the present invention, which will become apparent hereinafter, are achieved by providing loss-preventing means including spring means acting in a direction transverse to a longitudinal extent of the side walls and narrowing, at least partially, the inner width of the receiving space.

By forming the loss-preventing means as spring means acting transverse to the longitudinal extent of the side walls and narrowing the inner width of the receiving space, a constructively simple switching of the loss-preventing means between blocking and release positions and, thereby, an economical manufacturing of the magazine strip and, in particular, of the loss preventing means, are insured. The narrowing of the receiving space prevents an undesired displacement of the fastening elements in the longitudinal direction of the magazine strip out of the receiving space. With the use of the spring means, release of the loss-preventing means by an actuation force became possible, which provides for displacement of the fastening element out of the receiving space upon application of the actuation force. The narrowing of the inner width of the receiving space is so dimensioned that at least in one point of the receiving space, the inner width of the receiving space is smaller than the diameter of the fastening element.

Advantageously, the loss-preventing means is provided at one of the longitudinal ends of the magazine strip, preventing the displacement of fastening elements out of the receiving space at that longitudinal end. According to further development of the present invention, the loss-preventing means is provided at both longitudinal ends of the magazine strip in order to be able to insert the magazine strip from both longitudinal ends, e.g., in a magazine strip-receiving space in a screw driving tool.

Advantageously, the side walls are preloaded against each other, at least regionwise, by the spring means for retaining one or several fastening elements force- and/or friction-lockingly in the magazine strip.

Advantageously, the spring means is formed by a region of one or both walls, which insures an economical manufacturing of the magazine strip. E.g., at least some regions of the side walls and/or the rear wall can be formed of an elastic material. The elasticity of the material in the region of the spring means insures blocking of the receiving space and, thereby, prevents an undesired displacement of a fastening element(s) out of the receiving space of the magazine strip.

Advantageously, at least one of the side walls is provided with at least one clamping web extending into the receiving space for clampingly retaining at least one fastening element.

Advantageously, the clamping web is provided on the free end of the sidewall to be able to easily actuate the loss-preventing means from outside, e.g., to release the lock-preventing means. Advantageously, the clamping webs are provided on both side walls at their respective free ends.

Advantageously, the clamping webs are provided at both longitudinal ends of the side walls for preventing the displacement of the fastening elements out of the receiving space at both longitudinal ends. This insures an economical manufacturing of the magazine strip.

The clamping web can be formed, preferably, by forming a depression in the side wall, which insures an easy manufacturing of the magazine strip. The depression can be formed, e.g., by a stamping process or by heat deformation. Advantageously, the depressions, which are formed in the side walls, can serve as receiving means for an engagement part of a magazine strip holder.

Advantageously, the spring means extends parallel to the magazine strip to insure application of substantially the same biasing force to regions acting upon by the spring means.

In order to insure an easy handling and an economical manufacturing of the magazine strip, the spring means advantageously is formed as one piece with the magazine strip.

Advantageously, at one or both free ends of the side walls, there is provided a cam element that extends approximately parallel to a longitudinal extent of fastening element received in the magazine strip. By providing the cam elements in the end regions of the magazine strips, the clamping webs, which retain the screws or other fastening elements against slipping out of the magazine strip, can be pressed away from each other by a suitable spreading element or spreading crank when the magazine strip is located in the feeding device of a hand-held power tool, so that the clamping webs would not block the displacement path of the fastening elements or screws upon actuation of the power tool. The cam elements can be formed as cylindrical or as rhomboidal prismatic bodies. When the cam elements are formed as rhomboidal prismatic bodies, two rhomboidal surfaces, or two cam elements are advantageously so arranged relative to each other that they form an entry funnel for a spreading member of a power tool. With the magazine strip being located in the power tool, the spreading element engages the two rhomboidal surfaces, which form an acute angle with each other, and pushes them apart from each other, whereby the clamping webs are pressed away from each other against the biasing force of the spring means.

The spreading force, which is necessary for pressing the clamping webs away from each other against the biasing force of the spring means can be optimized by providing in the side walls of the magazine strips slots that would divide the magazine strip into a front resilient section carrying the clamping webs and, if necessary, cam elements, and a second section carrying the fastening elements. In this case, the spring means is formed by only the end region(s) of the side wall(s) located in the front section.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 1 a view in a direction of arrow I in FIG. 2 of a first embodiment of a magazine strip according to the present invention;

FIG. 2 a side view of the magazine strip shown in FIG. 1 in a direction of arrow II;

FIG. 3 a perspective view of a section of the magazine strip shown in FIGS. 1-2 at an increased scale;

FIG. 4 a view in a direction of arrow VI in FIG. 5 of a second embodiment of a magazine strip according to the present invention;

FIG. 5 a side view of the magazine strip shown in FIG. 1 in a direction of arrow VI;

FIG. 8 a perspective view of a fourth embodiment of the magazine strip according to the present invention; and FIG. 9 a perspective view of a portion of a fifth embodiment of a magazine strip according to the present invention.

DETAILED DESCRIPTION OF THE PREFERRED EMBODIMENTS

Figure 6:
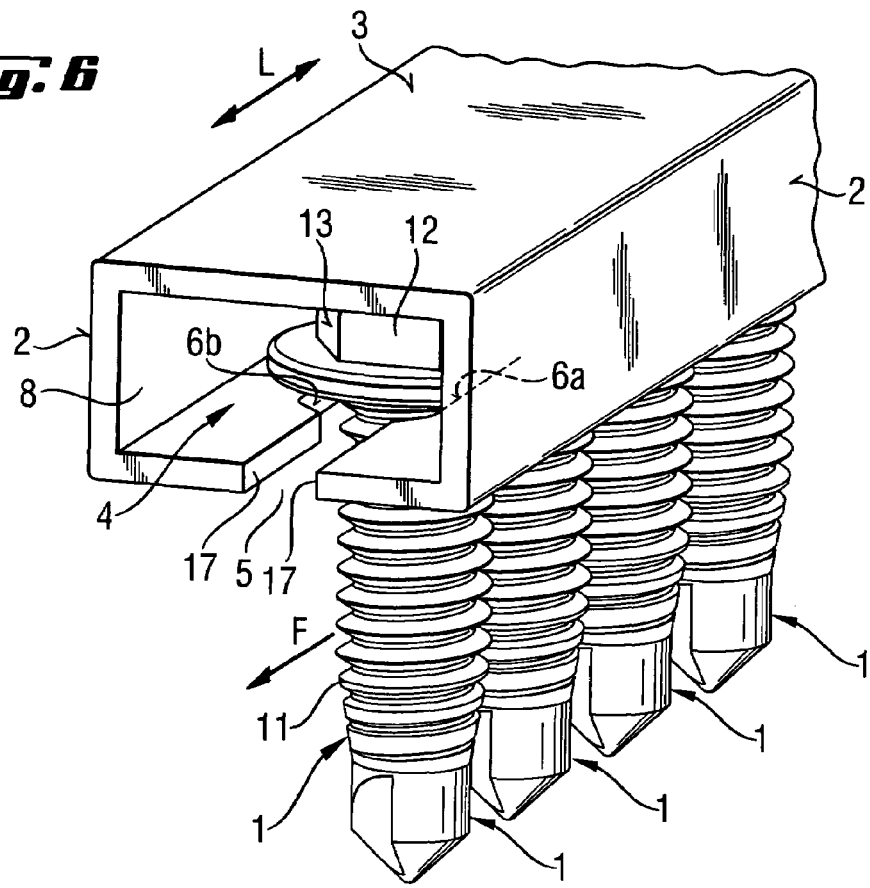
FIG. 6 a perspective view of a section of the magazine strip shown in FIGS. 4-5 at an increased scale.

A magazine strip according to the present invention for carrying fastening elements 1, in particular, screws, five embodiments of which are shown in FIGS. 1-9, has two opposite side walls 2 extending parallel to each other in a longitudinal direction L. The side walls 2 extend at a right angle from a rear wall 3, forming a receiving space 4 and defining, with their respective end regions 6a, 6b extending parallel to the rear wall 3, an opening 5 likewise extending in the longitudinal direction L. Corresponding longitudinal ends of the rear wall 3 and the side walls 2 form, at respective longitudinal ends of the strip magazine, end openings 8. The screws 1 are received in the receiving space 4. At least at one end of the magazine strip, there is provided loss-preventing or safety means 7 that prevents the screws from falling out through a respective end opening 8 transverse to the longitudinal direction L. The safety means 7 includes a spring element acting essentially transverse to the longitudinal extension of the side walls 2 and extending into the receiving space 4, narrowing, at least partially, the inner width of the receiving space 4.

The fastening element has a stem 11 at one end of which there is provided a head 12. The head 12 has, at its free end, torque-transmitting means, e.g., a polyhedron 13. At the end of the head 12 adjacent to the stem 1, there is provided a plain washer formed integrally with the stem 11. An outer thread is formed along at least a portion of the length of the stem 11. The fastening elements 1 are so received in the magazine strip that their longitudinal extent is substantially perpendicular to the rear wall 3. The width of the opening 5 in a direction transverse to the longitudinal extent L of the magazine strip is larger than a maximal diameter of the stem 11 but smaller than the maximal outer diameter of the head 12. The height of the receiving space 4 in a direction perpendicular to the rear wall 3 corresponds at least to the length of the head 12 in a direction of the longitudinal extent of the fastening element 1. The fastening elements 1 are arranged in the magazine strip with a possibility of displacement in the longitudinal direction L.

In the first embodiment of a magazine strip according to the present invention, which is shown in FIGS. 1-3, at each longitudinal end of the side walls 2, there is provided a depression 14, 15 a bottom of which projects into the receiving space 4 and forms a clamping web $14^1$, $15^1$ that serves as the safety means 7. The clamping webs $14^1$, $15^1$ extend perpendicular to the side walls 2 and into the receiving space 4, as particularly clearly can be seen in FIG. 3. The side walls 2 in particular are formed of an elasting material to provide for resilience of the safety means-forming spring elements. As an elasting material, in particular, a plastic material can be used. When a force F acts on a fastening element most adjacent, e.g., to the clamping web $14^1$ in a direction toward the clamping web $14^1$, the force F causes deformation of the side wall 2 in the region of the depression 14. With a sufficiently high force F, the safety means 7 is released, the clamping web $14^1$ becomes deformed, and the fastening element 1 is pushed out of the receiving space 4. Upon release of the force F, the spring force provides for restoration of the side wall 2, in particular, the depression 14, to its initial position shown in FIGS. 1 and 3.

FIGS. 4-6 show a second embodiment of a magazine strip according to the present invention. In this embodiment of the magazine strip, at each longitudinal end of the side walls 2, there are provided clamping webs 17, 18 which serve as safety means 7 and are arranged at the free end regions 6a, 6b. The clamping webs 17, 18 extend parallel to the rear wall 3 and into the opening 5, as it can clearly be seen in FIGS. 4 and 6. The side walls 2, due to their elasticity serve as resilient elements. The clamping webs 17, 18 swing out in a direction transverse to the side walls 2, whereby they are brought into their release position.

Figure 7:
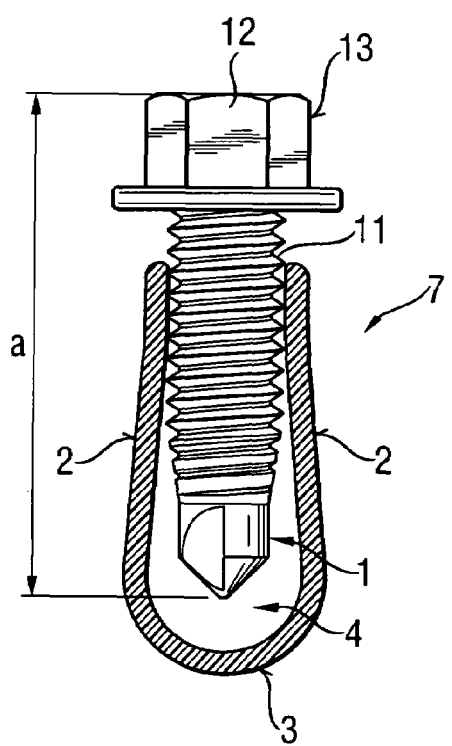
FIG. 7 a cross-sectional view of a third embodiment of a magazine strip according to the present invention.

A third embodiment of the magazine strip according to the present invention is shown in FIG. 7. In this embodiment, the safety means-forming spring element extends over the entire length of the magazine strip in a direction a and is formed by, preloaded against each other, side walls 2. The fastening elements 1 are secured, force- and/or friction-lockingly, with the two side walls 2. Contrary to the first and second embodiments, in the embodiment shown in FIG. 7, the head 12 is located outside of the receiving space 4. Such arrangement of the head 12 of a fastening element 1 permits to form a compact magazine strip with minimal consumption of the material the magazine strip is formed of. A force, which acts in the longitudinal direction of the magazine strip, overcomes the force- and/or friction-locking clamping, providing for displacement of a fastening element out of the magazine. In the embodiment of FIG. 7, the side walls 2 clamp the stem 11 of the fastening element 1 at least along a portion of its longitudinal extent or regionwise.

The magazine strip according to the present invention is used, e.g., with a power hand-held setting tool (not shown). The power tool has, e.g., a feeding device and a setting device, with a fastening element being advanced in a setting direction, one at a time, by the feeding device. The feeding device has an intersection portion that cooperates at least with one end of the magazine strip and, in particular, with the safety means 7 thereat. Upon cooperation of the intersection portion of the feeding device with the magazine strip, with the safety means 7, the safety means 7 is released, and a fastening element 1 is transported in the feeding direction. After the magazine strip is emptied, it is removed.

A further embodiment of a magazine strip according to the present invention is shown in FIG. 8. This embodiment differs from that shown in FIGS. 4-6 in that cylindrical cams 20 are provided on retaining surfaces 23 which define the longitudinal opening 5 and which extend at a right angle from the respective side walls 2. The cams 20 are provided in the region of the clamping webs 17. Both the side walls 2 and the retaining surfaces 23 are divided in two sections 24, 25 by respective slots 22. The sections 25 of the side walls 2 form the spring elements. The feeding device of a power setting tool, with which the magazine strip is used, has spreading means that presses the clamping webs 17 away from each other against the spring force of the spring elements, whereby the safety means 7 is released and the displacement of the fastening elements 1 in the setting tool takes place. The spreading means of the feeding device can include, e.g., a crank or one or more mandrels acting on the cams 20 for pressing the spring element-forming sections 25 of the side walls 20 away from each other.

A still further embodiment of a setting tool according to the present invention is shown in FIG. 9. In the embodiment shown in FIG. 9, fasten-elements are not shown. The magazine strip shown in FIG. 9 differs from that shown in FIG. 8 in that the cams 20 have a rhomboidal prismatic shape and have at least two rhomboidal surfaces 21. The rhomboidal surfaces 21 are arranged at an acute angle relative to each other with their intersection point lying in the central plane of the opening 5. The rhomboidal prismatic geometry of the cams 20 proved to be particularly advantageous when the feeding device of a setting tool, with which the magazine strip is used, is provided with one or more spreading mandrels which press the rhomboidal surfaces 21, which extend at an angle to the longitudinal axis of the magazine strip, and thereby, the clamping webs 17 and 18 away from each other against a spring force of the spring elements.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A magazine strip assembly comprising a plurality of screws (1); each having a head and a stem projecting from the head; and a magazine strip for carrying the screws (1) and having a rear wall (3), two opposite side walls (2) projecting from the rear wall (3) extending parallel to each other in a longitudinal direction (L) of the magazine strip, and forming together a space (4) for receiving the screws (1) at least along a portion of a longitudinal extent (a) of the screws, with end regions (6a, 6b) of the side walls (2) defining an opening (5) extending in the longitudinal direction (L) of the magazine strip and limiting the receiving space (4) and through which stems of the screws (1) extend, and loss-prevention means (7) provided at opposite longitudinal ends of the magazine strip for preventing the screws from falling out in a direction transverse to the longitudinal direction of the magazine strip, the loss-preventing means having spring means acting in a direction transverse to a longitudinal extent of the side walls (2) and narrowing at least partially an inner width of the receiving space (4), the spring means comprising at least one clamping web (17, 18) provided at at least one end region (6a, 6b) of the side walls (2) and extending substantially perpendicular to one of the side walls (2) and parallel to the rear wall (3) in a spaced relationship thereto and into the opening (5).

2. A magazine strip according to claim 1, wherein the side walls (2) comprises end region-defining retaining surfaces (23), and wherein at least one cam element (20) projects from at least one of the retaining surfaces (23) in a direction substantially perpendicular to a longitudinal extent of the magazine strip.

3. A magazine strip assembly according to claim 2, comprising a further cam element (20) projecting from another of the retaining surfaces (23) in the direction substantially perpendicular to the longitudinal extent of the magazine strip.

4. A magazine strip assembly according to claim 2, wherein the at least one cam element (20) is adapted for interacting with spreading means of a feeding device of a power setting tool.

5. A magazine strip assembly according to claim 2, wherein the at least one cam element (20) is associated with the at least one clamping web (17, 18).

6. A magazine strip assembly according to claim 1, wherein the at least one of the side walls (2) have a slot (22) dividing the at least one of the side walls (2) into two sections (24, 25).

7. A magazine strip assembly according to claim 1, wherein the spring means is formed by a section (25) of at least one of the side walls (2) projecting from the rear wall (3).

8. A magazine strip assembly according to claim 1, wherein the spring means comprises two clamping webs (17,

18) provided at the at least one end region (6a, 6b) of the side walls (2) and extending substantially perpendicular to the respective opposite side walls (2) parallel to the rear wall (3) and into the opening (5), projecting toward each other.

9. A magazine strip assembly according to claim 8, wherein the two clamping webs (17, 18) are provided at both end regions (6a, 6b) of the side walls.

10. A magazine strip assembly according to claim 8, wherein the two clamping webs (17, 18) are formed integrally with the side walls (2).

11. A magazine strip assembly according to claim 8, wherein the magazine strip is formed as a one-piece part.

12. A magazine strip assembly according to claim 1, wherein the opening (5)-defining end regions (6a, 6b) support the screw heads.

13. A magazine strip for carrying fastening elements (1), comprising a rear wall (3); two opposite side walls (2) projecting from the rear wall (3), extending parallel to each other in a longitudinal direction (L) of the magazine strip, and forming together a space (4) for receiving the fastening elements (1) at least along a portion of a longitudinal extent (a) of the fastening elements, with end regions (6a, 6b) of the side walls (2) defining an opening (5) extending in the longitudinal direction (L) of the magazine strip and limiting the receiving space (4); and loss-prevention means (7) provided at opposite longitudinal ends of the magazine strip for preventing the fastening elements from falling out in a direction transverse to the longitudinal direction of the magazine strip, the loss-preventing means having spring means acting in a direction transverse to a longitudinal extent of the side walls (2) and narrowing at least partially an inner width of the receiving space (4), wherein the spring means comprises at least one clamping web (17, 18) provided at at least one end region (6a, 6b) of the side walls (2) and extending substantially perpendicular to one of the side walls (2) and parallel to the rear wall (3) in a spaced relationship thereto and into the opening (5), wherein the side walls (2) comprises end region-defining retaining surfaces (23), and wherein at least one cam element (20) projects from at least one of the retaining surfaces (23) in a direction substantially perpendicular to a longitudinal extent of the strip magazine, and wherein the cam element has a rhomboidal prismatic shape.

\* \* \* \* \*

UNITED STATES PATENT AND TRADEMARK OFFICE
CERTIFICATE OF CORRECTION

PATENT NO.       : 7,658,283 B2                                              Page 1 of 1
APPLICATION NO.  : 11/285553
DATED            : February 9, 2010
INVENTOR(S)      : Pally et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 741 days.

Signed and Sealed this

Twenty-eighth Day of December, 2010

David J. Kappos
*Director of the United States Patent and Trademark Office*